Sept. 13, 1960     H. R. HOLMES, JR     2,952,144
UNIVERSAL JOINT
Filed Sept. 1, 1959
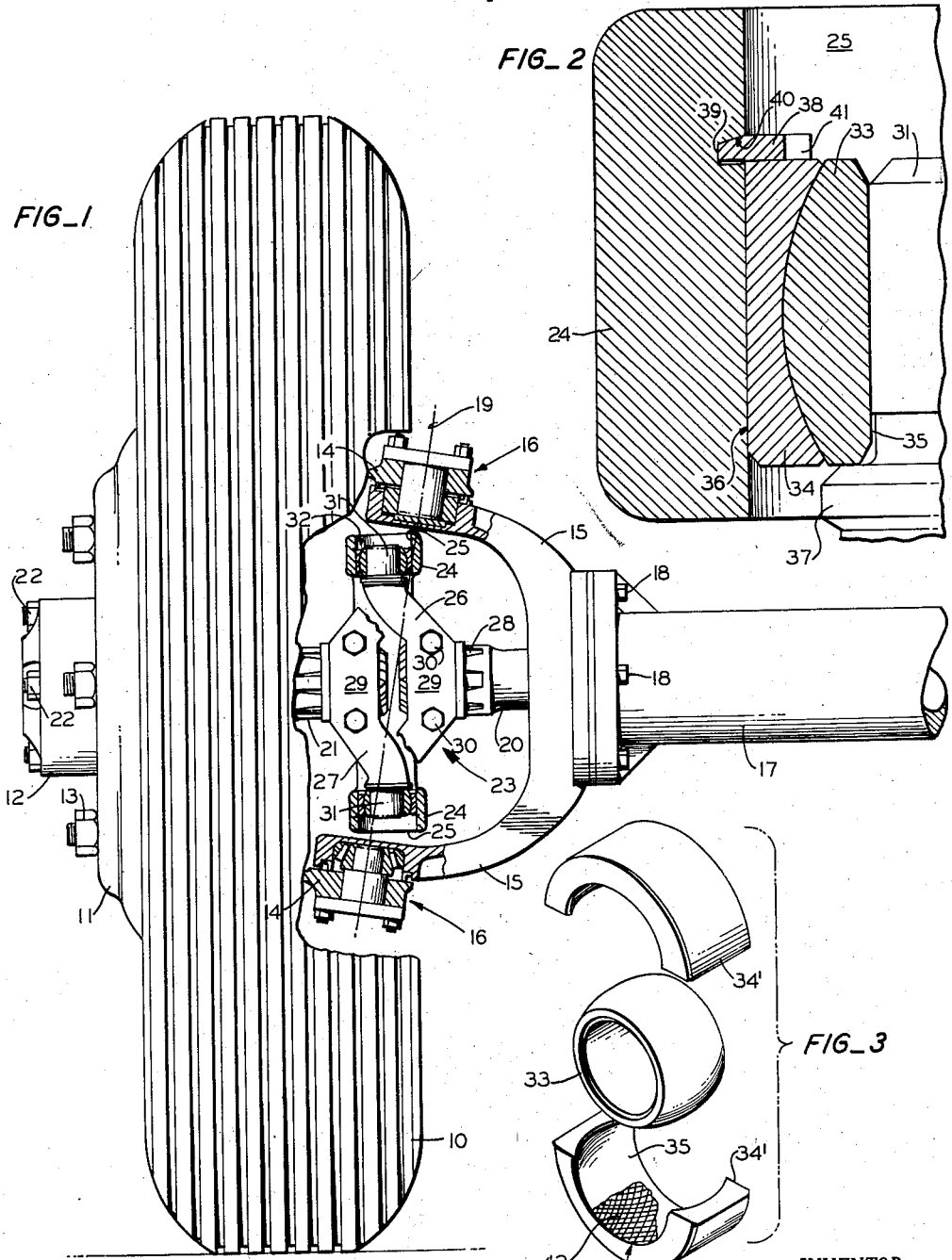
INVENTOR.
HARLEIGH R. HOLMES, JR
BY
*Naylor & Neal*
ATTORNEYS

United States Patent Office 2,952,144
Patented Sept. 13, 1960

2,952,144

UNIVERSAL JOINT

Harleigh R. Holmes, Jr., Oakland, Calif., assignor to F. A. B. Manufacturing Company, Oakland, Calif., a corporation of Nevada Filed Sept. 1, 1959, Ser. No. 837,468

5 Claims. (Cl. 64—17)

This invention relates to an improved universal joint and more particularly to such an improved joint which is particuarly useful in the axle of the steering wheels of a four-wheel drive vehicle.

It is well known that the universal joints employed in the steering wheel axles of four-wheel drive vehicles are subject to very rapid failure due to excessive wear. Numerous universal joints have been designed for these vehicles to make the joints last longer, but these joints have suffered from several disadvantages, namely, either they have not provided the desired long life for the universal joint or they required excessive expense in manufacture, installation and replacement.

Accordingly, it is a principal object of this invention to provide a universal joint of such rugged construction that it may be used without mechanical failure for long periods of time in the steering wheel axles of four-wheel drive vehicles.

It is another object of this invention to provide such a universal joint which is inexpensive in manufacture.

It is another object of this invention to provide such a universal joint which may be assembled very simply and in which the bearing members which are subject to wear can be simply replaced without disassembling the steering wheel mechanism.

Other objects and advantages of the invention will become apparent from the following description read in conjunction with the attached drawing in which:

Figure 1 is a side elevation, partially broken away, of a drive steering wheel together with its mounting and the universal joint of this invention;

Figure 2 is a detailed view, in cross section, of the bearing means used in the universal joint of Figure 1; and Figure 3 is an exploded perspective view of the major bearing elements illustrated in Figure 2.

Broadly stated the invention comprises, in a universal joint connecting a driver shaft to a driven shaft, said universal joint comprising a compensating ring having four radially extending apertures therein equally spaced around said ring and two torque bars each connected to one of said shafts and having two coaxial end portions pivotally mounted in two of said apertures in said compensating ring, the improvement comprising bearing means in each of said apertures pivotally connecting said compensating ring to said end portions of said torque bars, the bearing means in each of said apertures comprising a first bearing member mounted in said aperture, a second bearing member mounted on the end portion of said torque bar, means carried by said compensating ring for retaining said first bearing member against radial movement in one direction therein, and means carried by said torque bar for retaining said second bearing member against radial movement thereon in the opposite direction, said first and second bearing members contacting each other along a surface having the shape generated by rotating about the axis of said end portion of said torque bar a curved line coplanar with said axis.

Referring now in detail to the drawings, a steerable wheel 10 is mounted on a wheel rim 11 which is in turn connected to a hub 12 by means of lug nuts 13. The hub 12 is rotatably connected to an outer wheel housing 14 by conventional means. Outer wheel housing 14 is pivotally connected to inner wheel housing 15 by means of a conventional king pin pivotal linkage generally indicated at 16. The inner wheel housing 15 is mounted an axle housing 17 by means of bolts 18. Conventional steering means, not shown, are provided for rotating outer wheel housing 14 and wheel 10 with respect to inner wheel housing 15 about king pin 16. King pin 16 is inclined inwardly with respect to the axis of the axle housing 17 so that the axis 19 of king pin 16 intersects the ground under the axial center of the wheel thus reducing the resistance of wheel 10 to rotation around king pin 16.

A drive axle 20 is rotatably mounted in axle housing 17 coaxial therewith. Axle 20 is customarily the front axle of a four-wheel drive vehicle. A driven axle 21 is rotatably mounted in outer wheel housing 14 by conventional means, not shown, and is rigidly connected to wheel hub 12 by bolts 22. The outer end of drive axle 20 is connected to the inner end of driven axle 21 by means of the improved universal joint of this invention indicated generally at 23 in Figure 1.

The universal joint 23 comprises a compensating ring 24 having four radially extending apertures 25 therein spaced equally around compensating ring 24. Two identical torque bars 26 and 27 are mounted on driver shaft 20 and driven shaft 21 respectively slidable thereon in spline 28 on shafts 20 and 21. Each torque bar comprises a central hub portion 29 which is compressed and clamped onto the splined shaft by bolts 30. Each torque bar has two generally cylindrical coaxial end portions 31 which are rotatably mounted in opposed apertures 25 of compensating ring 24 by means of bearing means generally indicated at 32 in Figure 1 and illustrated in greater detail in Figures 2 and 3.

The center of universal joint 23 is located at the center of compensating ring 24 where the axes of axles 20 and 21 intersect. When the wheel suspension is first assembled, this center of universal joint 23 is adjusted to lie on axis 19 of king pin 16 by sliding the universal joint on shafts 20 and 21 before bolts 30 are tightened.

Bearing means 32 comprises a bearing member 33 mounted on end portion 31 of each torque bar and a bearing member 34 mounted in aperture 25 of compensating ring 24. While bearing members 33 and 34 may be keyed to torque bar end portions 31 and compensating ring 24, respectively, the bearing members are preferably freely rotatable with respect to the torque bars and compensating ring. Accordingly, bearing members 33 and 34 have generally cylindrical surfaces 35 and 36 in contact with end portion 31 and aperture 25, respectively, and bearing members 33 and 34 contact each other along curved surface 35 which is preferably spherical with its center on the common axis of aperture 25 and end portion 31. As illustrated in Figure 3, bearing member 34 is made up of two matching halves 34' which embrace bearing member 34 between them.

A shoulder 37 is provided on each end portion 31 of the torque bars, and abuts against bearing member 33 to limit the inward radial movement of bearing member 33. A snap ring 38 is mounted in a matching groove 39 in aperture 25 abutting against bearing member 34 to limit the outward radial movement of bearing member 34. It is desirable to have the radial distance between shoulder 37 and snap ring 38 sufficiently great that torque bars 26 and 27 can move a short distance transversely of compensating ring 24 thereby reducing damage to working parts when the universal joint is subjected to shock. This flexibility of the universal joint can be obtained in this manner by providing clearance between bearing members 33 and 34 and shoulder 37 and snap ring 38, but this flexibility is preferably obtained by providing a surface 40 on groove 39 inclined with respect to the axis of aperture 25 and providing a corresponding inclined surface on snap ring 38 so that the resiliency of snap ring 38, urging snap ring 38 into groove 39, will resiliently urge snap ring 38 and bearing member 34 toward shoulder 37.

The efficiency and life of the universal joint of this invention are greatly increased by providing a specific anti-friction surface between bearing members 33 and 34. As illustrated in Figure 3, the inner spherical surface 35 of outer bearing member 34 is provided with a cross-hatched network of grooves 42 covering the entire inner surface of bearing member 34. A thin film 43 of Teflon (poly-tetrafluoro-ethylene manufactured by E. I. du Pont de Nemours & Co., Inc.), is deposited on the surface 35 of bearing member 34 filling the grooves therein. The network 42 of grooves is preferably made up of two sets of grooves, each set running at right angles to the other set. Conveniently each groove follows the line of intersection of spherical surface 35 with a diametric plane of such spherical surface inclined at an angle of about 45° to the axis of bearing member 33.

The Teflon coating is deposited on surface 35 by spraying the surface with Teflon dissolved in a suitable solvent and sintering bearing member 34 at a temperature of 400 to 600° F. This procedure deposits a Teflon coating about 0.00075 inch thick, and the bearing member 34 is resprayed and sintered a sufficient number of times that a coating of the desired thickness is obtained. Preferably the grooves of network 42 are cut to a depth of about 0.001 to 0.005 inch and a Teflon coating of about the same thickness is applied thereto. The outer surface of bearing member 33 is formed of a hard smooth material such as chromium plating.

It should be understood that it is possible to employ other anti-friction means in the universal joint of this invention, and particularly that it is possible to deposit the Teflon coating on the surface of a bearing member 33 and provide the bearing member 34 with a hard smooth surface; however, the particular bearing means described has proven to be the most efficient.

The universal joint constructed with the particular Teflon coated bearing described and the mounting means for that bearing has a longer life before mechanical breakdown in the steering wheel axles for four wheel drive vehicles than any other universal joint known heretofore. Specifically, the Teflon coating does not break down even though the surface of bearing member 34 is very hard and smooth between the grooves in network 42, and the metal surfaces of bearing members 33 and 34 are subjected to very little wear.

Bearing means 32 are economical to manufacture and may be very easily installed and replaced in the universal joint. When, after extensive use, the bearing means 32 have become worn, snap rings 38 may be removed by means of a pair of lugs 41 thereon on opposite sides of the opening in snap rings 38. The bearing means may then be slid radially outwardly through apertures 25 and similarly replaced.

While a particular embodiment of the invention has been illustrated herein, the invention includes the equivalents of the features herein described, and the invention is accordingly limited only by the express requirements of the following claims.

What is claimed is:

1. In a universal joint connecting a driver shaft to a driven shaft, said universal joint comprising a compensating ring having four radially extending apertures therein equally spaced around said ring and two torque bars each connected to one of said shafts and having two coaxial end portions pivotally mounted in two of said apertures in said compensating ring, the improvement comprising bearing means in each of said apertures pivotally connecting said compensating ring to said end portions of said torque bars, the bearing means in each of said apertures comprising a first bearing member mounted in said aperture, a second bearing member mounted on the end portion of said torque bar, first restraining means carried by said compensating ring for preventing movement of said first bearing member radially outwardly of said compensating ring, and second restraining means carried by said torque bar for preventing movement of said second bearing means radially inwardly of said torque bar, said first and second bearing members contacting each other along a frusto-spherical surface the center of which lies on the axis of said end portion of said torque bar, said first bearing member being rotatable with respect to said compensating ring and said second bearing member being rotatable with respect to said torque bar.

2. In a universal joint connecting a driver shaft to a driven shaft, said universal joint comprising a compensating ring having four radially extending apertures therein equally spaced around said ring and two torque bars each connected to one of said shafts and having two coaxial end portions pivotally mounted in two of said apertures in said compensating ring, the improvement comprising bearing means in each of said apertures pivotally connecting said compensating ring to said end portions of said torque bars, the bearing means in each of said apertures comprising a first bearing member mounted in said aperture, a second bearing member mounted on the end portion of said torque bar, first restraining means carried by said compensating ring for preventing movement of said first bearing member radially outwardly of said compensating ring, and second restraining means carried by said torque bar for preventing movement of said second bearing means radially inwardly of said torque bar, said first and second bearing members contacting each other along a frusto-spherical surface the center of which lies on the axis of said end portion of said torque bar, said first and second restraining means being separated by a radial distance sufficient to permit limited radial movement between said torque bar and said compensating ring.

3. In a universal joint connecting a driver shaft to a driven shaft, said universal joint comprising a compensating ring having four radially extending apertures therein equally spaced around said ring and two torque bars each connected to one of said shafts and having two coaxial end portions pivotally mounted in two of said apertures in said compensating ring, the improvement comprising bearing means in each of said apertures pivotally connecting said compensating ring to said end portions of said torque bars, the bearing means in each of said apertures comprising a first bearing member mounted in said aperture, a second bearing member mounted on the end portion of said torque bar, first restraining means carried by said compensating ring for preventing movement of said first bearing member radially outwardly of said compensating ring, and second restraining means carried by said torque bar for preventing movement of said second bearing means radially inwardly of said torque bar, said first and second bearing members contacting each other along a frusto-spherical surface the center of which lies on the axis of said end portion of said torque bar, said second restraining means comprising a flange on said torque bar, and said first restraining means comprising a snap ring disposed in a channel in said aperture and having an inclined surface thereon resiliently urging said first bearing toward said flange.

4. In a universal joint connecting a driver shaft to a driven shaft, said universal joint comprising a compensating ring having four radially extending apertures therein equally spaced around said ring and two torque bars each connected to one of said shafts and having two coaxial end portions pivotally mounted in two of said apertures in said compensating ring, the improvement comprising bearing means in each of said apertures pivotally connecting said compensating ring to said end portions of said torque bars, the bearing means in each of said apertures comprising a first bearing member mounted in said aperture, a second bearing member mounted on the end portion of said torque bar, first restraining means carried by said compensating ring for preventing movement of said first bearing member radially outwardly of said compensating ring, and second restraining means carried by said torque bar for preventing movement of said second bearing means radially inwardly of said torque bar, said first and second bearing members contacting each other along a frusto-spherical surface the center of which lies on the axis of said end portion of said torque bar, said frusto-spherical surface of one of said bearing members being provided with a cross-hatched network of grooves therein, and a film of poly-tetrafluoro-ethylene being deposited on said surface of said bearing member covering said grooves.

5. In a universal joint connecting a driver shaft to a driven shaft, said universal joint comprising a compensating ring having four radially extending apertures therein equally spaced around said ring and two torque bars each connected to one of said shafts and having two coaxial end portions pivotally mounted in two of said apertures in said compensating ring, the improvement comprising bearing means in each of said apertures pivotally connecting said compensating ring to said end portions of said torque bars, the bearing means in each of said apertures comprising a first bearing member mounted in said aperture, a second bearing member mounted on the end portion of said torque bar, first restraining means carried by said compensating ring for preventing movement of said first bearing member radially outwardly of said compensating ring, and second restraining means carried by said torque bar for preventing movement of said second bearing means radially inwardly of said torque bar, said first and second bearing members contacting each other along a frusto-spherical surface the center of which lies on the axis of said end portion of said torque bar, said frusto-spherical surface of said first bearing member being provided with a cross-hatched network of grooves therein consisting of two generally perpendicular sets of parallel grooves, each groove following the line of intersection of said spherical surface with a diameter plane of said surface inclined at an angle of about 45° to the axis of said first bearing member, and a film of poly-tetrafluoro-ethylene being deposited on said surface of said first bearing member filling said grooves.

References Cited in the file of this patent

UNITED STATES PATENTS

| | | |
|---|---|---|
| 1,680,095 | Domizi | Aug. 7, 1928 |
| 2,024,206 | Buel | Dec. 17, 1935 |
| 2,596,202 | Bolte | May 13, 1952 |
| 2,681,259 | White | June 15, 1954 |
| 2,781,238 | Carter | Feb. 12, 1957 |
| 2,885,248 | White | May 5, 1959 |